United States Patent [19]

Johnston

[11] 4,104,802
[45] Aug. 8, 1978

[54] APPARATUS FOR USE IN MANUFACTURING AND SELECTING GOLF CLUBS

[76] Inventor: Clyde H. Johnston, 1182-15th St., Holly Hill, Fla. 32017

[21] Appl. No.: 831,247

[22] Filed: Sep. 7, 1977

[51] Int. Cl.² .................... G01B 5/00; A63B 57/00; A63B 69/36
[52] U.S. Cl. .................... 33/174 F; 33/1 N; 273/80 D
[58] Field of Search .............. 33/174 F, 1 N, 174 R; 273/32 R, 80 D, 80.1, 193 R, 193 B, 194 R, 194 A

[56] References Cited

U.S. PATENT DOCUMENTS

| 1,550,665 | 8/1925 | Barnes | 273/80.1 |
| 3,096,982 | 7/1963 | Bassin | 273/80.1 |
| 3,102,726 | 9/1963 | Barrett | 273/80.1 |

FOREIGN PATENT DOCUMENTS

| 15,696 | 6/1929 | Australia | 273/80 D |
| 407,989 | 3/1934 | United Kingdom | 33/174 F |

OTHER PUBLICATIONS

"Gage Helps Golfer Fit Clubs to His Stance", *Popular Science Monthly*, Jan., 1933, p. 53.

Primary Examiner—Richard R. Stearns
Attorney, Agent, or Firm—John N. Randolph

[57] ABSTRACT

An apparatus for use in rapdily and accurately obtaining correct measurements for golf clubs best suited to a particular golfer, so that clubs can be customed made to those measurements or for selecting clubs which correspond to the measurements obtained from the apparatus.

4 Claims, 4 Drawing Figures

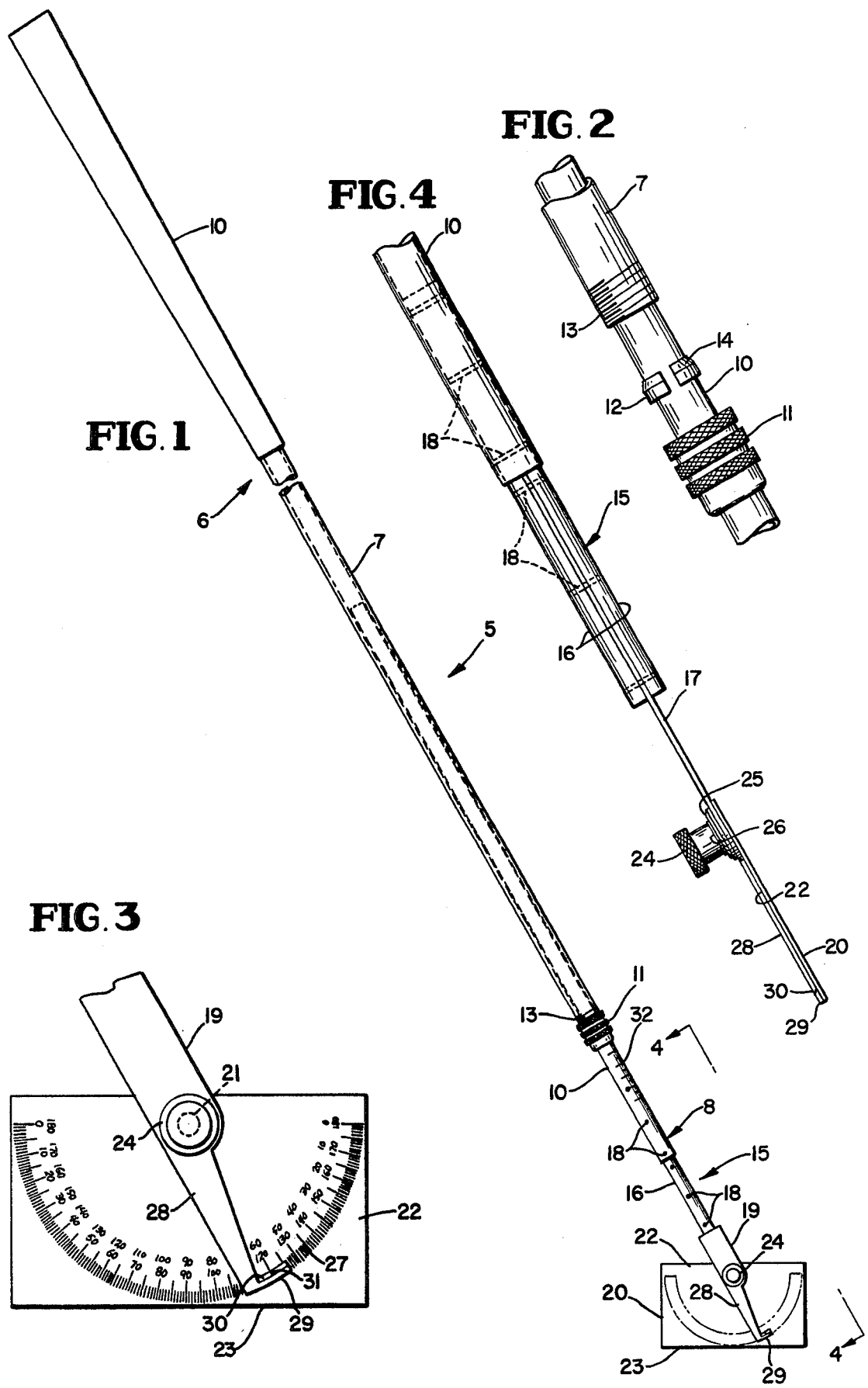

APPARATUS FOR USE IN MANUFACTURING AND SELECTING GOLF CLUBS

SUMMARY

It is a primary object of the present invention to provide an inexpensive apparatus which may be utilized for rapidly and accurately determining the correct characteristics of a golf club to be used by a particular player, depending upon his height, arm length and posture, so that a golf club or clubs best suited to the individual's requirements can be selected or custom-made.

A further object of the invention is to provide such an apparatus which may be readily utilized without the use of of any other instruments or devices.

Various other objects and advantages of the invention will hereinafter become more fully apparent from the following description of the drawing, illustrating a presently preferred embodiment thereof, and wherein:

BRIEF DESCRIPTION OF THE DRAWING

FIG. 1 is a side elevational view of the apparatus;

FIG. 2 is an enlarged fragmentary elevational view showing parts of the shaft disconnected from one another;

FIG. 3 is an enlarged view of the lower end of the apparatus as seen in FIG. 1, and FIG. 4 is an enlarged fragmentary front elevational view of the lower portion of the apparatus as viewed along the line 4—4 of FIG. 1.

DESCRIPTION OF THE PREFERRED EMBODIMENT

Referring more specifically to the drawing, the apparatus for use in manufacturing and selecting golf clubs is designated generally 5 and includes a shaft 6 having a long upper section 7 which is tubular, and a lower section 8. A conventional golf club grip 10 is secured around the upper end of the upper section 7.

The lower section 8 includes an upper tube portion 10 which fits slidably into the lower part of the upper shaft section 7 and which protrudes from the lower end thereof. A thumb nut 11 is slidably and rotatably mounted on the exposed lower part of the tube portion 10 below a split ferrule 12 which is also slidably mounted on said portion 10, between the nut 11 and an externally threaded lower end 13 of the upper shaft section 7. The ferrule 12 is externally bevelled at 14 on its upper portion, and said bevelled part is adapted to be wedged between the shaft portion 10 and the lower end of the shaft section 7, when the nut 11 is threadedly engaged with and tightened on the threaded shaft end 13, for retaining the shaft sections 7 and 8 in selected adjusted positions, with the lower shaft section 8 extended to any desired distance relative to the upper shaft section 7.

The lower shaft section 8 includes a lower rod portion 15 which fits into the lower end of the portion 10. Said rod portion 15 is composed of two rod sections 16, each of which is nearly semicircular in cross section, and a bar 17 which is sandwiched between the rod sections 16. Dowels or other suitable fastenings 18 secure the bar 17 between the rod sections 16 and also secure the parts 16 and 17 immovable to the lower part of the shaft portion 10. The bar 17 has an extension 19 at its lower end. A rectangular plate 20 has a shaft 21 fixed at one end therein and projecting from a front side 22 of said plate, midway of its ends and remote from a bottom edge 23 thereof. A portion of the exposed part of the shaft 21 is threaded to receive a thumb nut 24. A washer 25 is mounted on the shaft between the plate 20 and nut 24, and a lock washer 26 is disposed on the shaft between the washer 25 and nut 24.

The front face 22, as best seen in FIG. 3, has a protractor scale 27 inscribed thereon. The extension 19 has a terminal portion or arm 28, disposed beyond the nut 24, which overlies a part of the front face 22 and which extends across a part of the scale 27. Said arm 28 terminates in a lateral extension or blade 29 which is curved to conform to the curvature of the scale 27 and which has a bevelled inner portion 30 which is provided with a transversely disposed hairline 31 to be aligned selectively with graduations of the scale 27. Said hairline 31 aligns with the axis of the shaft 6.

With the nuts 11 and 24 loosened, the shaft 6 can be adjusted in length to best accommodate it to a particular golfer who is holding the shaft by the handgrip 9 in the same manner that he or she would hold a golf club, preparatory to striking a golf ball. When the shaft 6 has thus been adjusted to best suit the height, arm length and general posture of the player and with the bottom edge 23 of the plate 20 resting on a part of a flat surface on which the golfer is standing, the nut 11 is tightened to clamp the shaft in this desired adjusted position, and the nut 24 is tightened to clamp the plate 20 with its bottom edge 23 at the desired angle relative to the axis of the shaft 6, which is indicated by the location of the hairline 31 relative to a graduation or graduations of the scale 27. The shaft portion 10 includes suitable linear graduations 32 which can be utilized to determine the adjusted length of the shaft 6, so that a club or clubs can be selected for the player having a shaft or shafts of the proper length and a club head the sole or "lie" of which will have a proper angle relative to the axis of the shaft, corresponding to the angle as read on the protractor scale 27.

In a like manner, the linear and angular measurements obtained, as previously described, can be utilized for the custom-making of clubs best suited to the needs of a particular player.

Various modifications and changes are contemplated and may be resorted to without departing from the function or scope of the invention.

I claim as my invention:

1. An apparatus for use in the manufacture or selection of a golf club best suited to a particular player comprising an elongated shaft having an extensible lower section, means for clamping said shaft in different extended positions, an extension connected to and extending from the distal end of the extensible section of said shaft and having a longitudinally extending flat portion, a plate disposed against said flat portion, means pivotally connecting said plate to the extension for pivotal movement about an axis generally orthogonal to the axis of said shaft, said plate having a straight bottom edge adapted to rest on a flat surface which supports a player gripping an upper portion of said shaft, said extension having an arm extending beyond said pivot means and disposed against one side of said plate, said arm having an indicator positioned in alignment with the axis of said shaft, said one side of the plate having angle markings thereon for use with said indicator to indicate the angle formed by the axis of the shaft and the bottom edge of said plate for indicating the correct angle of the sole of a golf club head relative to a golf club shaft of a length corresponding to the length of the adjusted shaft of the apparatus.

2. An apparatus as in claim 1, means associated with said pivot means for clamping said plate with its bottom edge in different angularly adjusted positions relative to the axis of the shaft.

3. An apparatus as in claim 1, said angle markings comprising a protractor scale.

4. An apparatus as in claim 3, said arm having a laterally extending blade at its outer end curved to conform to the curvature of said protractor scale, and said indicator disposed in alignment with the axis of the shaft comprising a hairline on the exposed side of said blade and positioned to form a continuation of a graduation of the scale which aligns with the shaft axis.

* * * * *